United States Patent [19]

Pecoraro et al.

[11] Patent Number: 4,919,697
[45] Date of Patent: Apr. 24, 1990

[54] VACUUM REFINING OF GLASSY MATERIALS WITH SELECTED FOAMING RATE

[75] Inventors: George A. Pecoraro, Lower Burrell; Larry J. Shelestak, Bairdford; Joseph E. Cooper, Natrona Heights, all of Pa.

[73] Assignee: PPG Industries, Inc., Pittsburgh, Pa.

[21] Appl. No.: 292,971

[22] Filed: Jan. 3, 1989

[51] Int. Cl.$^5$ .................................................. C03B 5/225
[52] U.S. Cl. ...................................... 65/134; 65/135; 65/136
[58] Field of Search ............... 65/32.5, 135, 136, 346, 65/347, 374.12, 134

[56] References Cited

U.S. PATENT DOCUMENTS

| | | |
|---|---|---|
| 805,139 | 11/1905 | Hitchcock . |
| 1,564,235 | 12/1925 | Harrington . |
| 1,598,308 | 8/1926 | Pike . |
| 2,781,411 | 2/1957 | Geffcken et al. ......................... 13/31 |
| 2,877,280 | 3/1959 | Eden ........................................... 13/6 |
| 3,338,694 | 8/1967 | Davy ......................................... 65/32 |
| 3,429,684 | 2/1969 | Plumat ..................................... 65/335 |
| 3,442,622 | 5/1969 | Monnier et al. ..................... 23/223.5 |
| 3,519,412 | 7/1970 | Olink ....................................... 65/337 |
| 3,589,885 | 6/1971 | Monks .................................... 65/32.5 |
| 3,617,231 | 11/1971 | Fenstermacher ....................: 65/134 |
| 4,195,982 | 4/1980 | Coucoulas et al. ................... 65/134 |
| 4,381,934 | 5/1983 | Kunkle et al. ......................... 65/135 |
| 4,738,938 | 4/1988 | Kunkle et al. ..................... 65/135 X |

Primary Examiner—Joye L. Woodard
Attorney, Agent, or Firm—Dennis G. Millman

[57] ABSTRACT

In a method of vacuum refining molten glass or the like, sufficient concentrations of volatilizable substances are provided in the molten material.

17 Claims, 1 Drawing Sheet

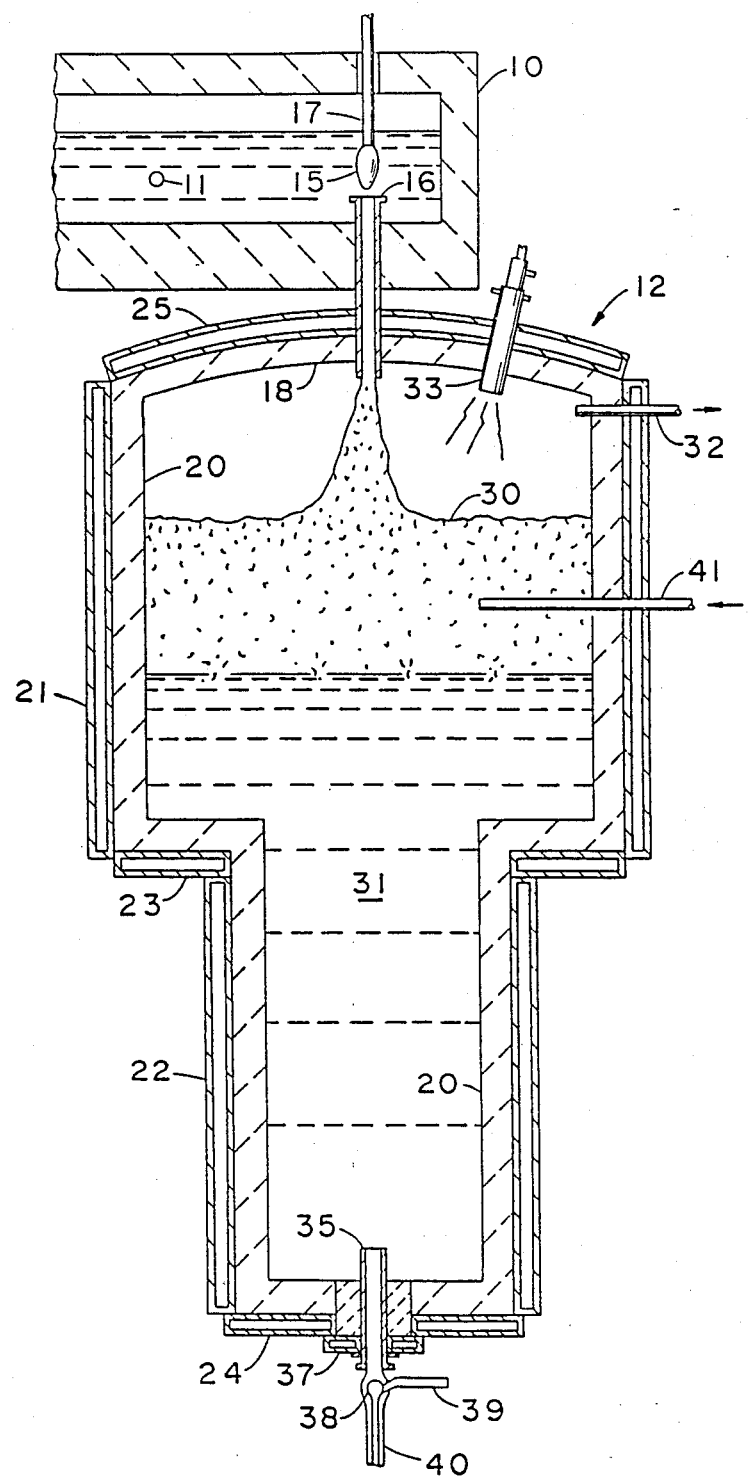

VACUUM REFINING OF GLASSY MATERIALS WITH SELECTED FOAMING RATE

BACKGROUND OF THE INVENTION

The present invention relates to the use of subatmospheric pressure to expedite refining of molten glass or the like. More particularly, the invention relates to a selected rate and extent of foaming in such a refining technique that yields improved refining performance.

In the melting of glass, substantial quantities of gas are produced as a result of decomposition of batch materials. Other gases are physically entrained by the batch materials or are introduced into the melting glass from combustion heat sources. Most of the gas escapes during the initial phase of melting, but some becomes entrapped in the melt. Some of the trapped gas dissolves in the glass, but other portions form discrete gaseous inclusions known as bubbles or "seeds" which would be objectionable if permitted to remain in unduly high concentrations in the product glass. The gas inclusions will rise to the surface and escape from the melt if given sufficient time in the stage of a melting operation known as "refining" or "fining." High temperatures are conventionally provided in the refining zone to expedite the rise and escape of the gaseous inclusions by reducing the viscosity of the melt and by enlarging the bubble diameters. The energy required for the high temperatures employed in the refining stage and the large melting vessel required to provide sufficient residence time for the gaseous inclusions to escape from the melt are major expenses of a glassmaking operation. Accordingly, it would be desirable to assist the refining process to reduce these costs.

It has been known that reduced pressure could assist the refining process by reducing the partial pressure of the included gaseous species and by increasing the volume of bubbles within the melt so as to speed their rise to the surface. The impracticality of providing a gas-tight vessel on the scale of a conventional refining chamber so as to draw a vacuum therein has limited the use of vacuum refining to relatively small scale batch operations such as disclosed in U.S. Pat. Nos. 1,564,235; 2,781,411; 2,877,280; 3,338,694; and 3,442,622.

Continuous vacuum refining processes have been proposed but have not found acceptable for large scale, continuous manufacture of glass due to various drawbacks. In the continuous vacuum refining arrangements shown in U.S. Pat. Nos. 805,139; 1,509,308; and 3,519,412 a disadvantage is the requirement for relatively narrow vertical passageways leading into and out of the vacuum zone necessitated by the pressure difference. Also, the molten glass is not fully exposed to the vacuum since the incoming glass enters from below a pool of glass.

A different arrangement is shown in U.S. Pat. No. 3,429,684, wherein batch materials are fed through a vacuum lock and melted at the top of a vertically elongated vacuum chamber. Melting raw materials within the vacuum chamber is a disadvantage of that arrangement for three reasons. First, large volumes of foam would be created by carrying out the initial decomposition of the raw materials under vacuum, which would require a vessel large enough to contain the foam. Second, there is a danger that raw materials may follow a short circulation path to the output stream, thus avoiding adequate melting and refining. Third, carrying out the initial stages of melting and heating the melt to a refining temperature within the vacuum vessel require large amounts of heat to be supplied to the melt within the vessel. Such a major heat input to the vessel inherently induces convection currents within the melt that increase erosion of the walls, which leads to contamination of the refined product stream.

U.S. Pat. No. 4,195,982 discloses initially melting glass under elevated pressure and then refining the glass in a separate chamber at a lower pressure. Both chambers are heated.

A preferred technique for vacuum refining glass is disclosed in U.S. Pat. No. 4,738,938 (Kunkle et al.) wherein the creation of foam is deliberately enhanced by introducing the molten glass into the vacuum chamber above the level of the molten glass held therein. Excessive foam was indicated in that patent as being a problem to be avoided. A large space above the liquid container must be provided to accommodate the foam if a large throughput is desired. Since this headspace must also be maintained gas-tight, its construction can be a significant economic drawback, particularly on a large scale process. As a result, the volume of foam acts as a limiting factor to the throughput rate and/or the degree of vacuum that can be utilized.

One measure for maintaining reasonable foam volume that is disclosed in U.S. Pat. No. 4,738,938 is to minimize and, preferably, to eliminate the presence of sulfur, generally present in the form of $SO_3$, in the molten glass entering the vacuum chamber. The use of sulfur compounds is common in the glassmaking art as melting and refining aids. But in the vacuum refining technique of the aforesaid patent, the inclusion of sulfur compounds was disclosed to be unnecessary and to be a major source of unwanted foam. Following the teachings of the patent, the deliberate addition of refining aids such as sulfur compounds has been eliminated, and refining has generally been adequate. However, on some occasions, for reasons that were previously not understood, periods of inadequate removal of gaseous seeds from the glass occurred, even though the glass entering the vacuum refiner was very low in gas content and low pressures were used.

SUMMARY OF THE INVENTION

The present invention is based on the surprising discovery that when refining glass or the like by vacuum, glass having a low concentration of gases when entering the vacuum chamber may be refined less adequately by the vacuum than glass having a higher gas content. This finding is contrary to expectations since it would seen that removal of gases would be easiest with the glass having the lowest gas content. But it is now theorized that the thoroughness of the refining is dependent upon the degree of volume expansion produced by the foaming of the melt as it enters the vacuum chamber. The volume expansion of the foam is, in turn, a function of the concentration of relatively volatile substances in the molten glass which enter the gas phase with the reduced pressure of the vacuum chamber. Therefore, even though removal of volatile substances is the overall objective of refining, it appears that the presence of certain amounts of these substances is beneficial to act as foaming agents. At the same time, accumulation of undue amounts of foam within the chamber remains a problem.

The expansion of dissolved and entrained gases as the melt encounters the reduced pressure of the vacuum chamber is advantageously of such a magnitude to render substantially all of the liquid into the membrane walls of the foam structure. Stretching of the membrane walls by further expansion is also desirable because it reduces the thickness of the membranes, which is believed to reduce the size of the largest gaseous seed that can exist within the membranes. Additionally, the more the foam membranes have been stretched, the more readily the foam subsequently collapses. It is an object of the present invention to provide sufficient volume expansion so as to adequately refine the glass and to rapidly collapse the foam while avoiding impractically large accumulation of foam.

It has been found that these objectives can be met by providing in the molten glass entering the vacuum chamber sufficient quantities of materials that will volatilize at the reduced pressure conditions of the vacuum chamber so as to produce a foam having at least eight times the volume of the molten glass liquid. Preferably the foam volume is at least ten times the molten glass volume, and most preferably at least fourteen times. Depending upon the space available in the vessel, foam expansion ratios on the order of twenty or more may require auxiliary means to expedite collapse of the foam in order to limit the height of the foam layer that gathers within the refining chamber.

The expansion ratio is also dependent on the pressure within the vacuum chamber and the vapor pressure of the volatile material at the particular temperature of the melt. Knowing these factors permits the concentration of volatile species required to be present in the glass to yield a desired volume expansion upon foaming to be estimated by using the ideal gas laws.

Substances that may serve as the foaming agent of the present invention are characterized by high vapor pressure at the temperature and pressure conditions within the vacuum refining chamber. Compounds that have been used as refining aids in conventional melting and refining processes are volatile at atmospheric pressure and melting temperatures and, thus, are excellent candidates for actively forming a gas phas when entering the vacuum chamber in accordance with the present invention. These include sulfur and its compounds (e.g., sodium sulfate, calcium sulfate) and halogens and their compounds (e.g., alkali halides such as sodium chloride and calcium fluoride). The specific amounts of these foaming agents that should be present in the molten glass about to be refined will depend upon the particular operating conditions, but typically when sulfur is the primary agent satisfactory results have been obtained when the concentration of sulfur (measured as $SO_3$) in the molten glass entering the vacuum chamber is in the range of 0.010 to 0.040 percent by weight, preferably at least 0.025 percent. In the case of chlorine, the molten glass entering the vacuum chamber may include about 0.01 weight percent chlorine (measured as NaCl) as an example. Since volatilization of the foaming agents is essential to their purpose, the concentration of the foaming agent is substantially reduced in the vacuum refining chamber typically by at least forty percent. Due to their volatility, the concentration of sulfur or halogens is reduced by about 75 percent, and sometimes by as much as 90 percent or more.

The use of typical glass refining aids as foaming agents also yields benefits in initially decreasing viscosity and surface tension of the melt. As a result, foam bubbles an grow more easily so that the bubble membranes are reduced in thickness, thereby making it more difficult for small gaseous inclusions to remain undisturbed within the membrane walls. After the volatile substances are removed from the foam by vacuum, viscosity and surface tension are believed to increase, thereby expiditing collapse of the foam.

THE DRAWING

The FIGURE is a vertical cross-section through a vacuum refining vessel in accordance with a preferred embodiment of the present invention.

DETAILED DESCRIPTION

The detailed description will be set forth in conjunction with a method and apparatus specifically adapted for melting glass and similar glassy materials, but it should be understood that the invention is applicable to the processing of other materials as well.

Although not limited thereto, the present invention is advantageously used in conjunction with a vacuum refining system disclosed in U.S. Pat. No. 4,738,938. In that application an arrangement is disclosed whereby vacuum refining may be employed in a commercial scale, continuous glass melting process in a manner that advantageously and economically overcomes the drawbacks of the prior art. Molten glass is admitted to the vacuum refining chamber only after the majority of the thermal energy required for melting has been imparted to the melt so that little or no thermal energy need by supplied to the molten material contained within the vacuum chamber. Any known arrangement may be used to melt the glass prior to the refining step, but in preferred embodiments, batch materials are first liquefied at a stage specifically adapted for that step of the process such shown in U.S. Pat. No. 4,381,934, and the liquefied material is transferred to a second stage 10, a portion of which is shown in the FIGURE, where dissolution of solid particles is essentially completed and the temperature of the material may be raised to a temperature suitable for refining. Subsequently, the molten material is passed to the vacuum chamber 12. In that arrangement, a large portion of the gaseous by-products of melting are driven off before the material is subjected to vacuum, and the region of greatest gas evolution is separated from the refining zone, whereby materials undergoing the early stages of melting cannot become mixed with portions of the melt undergoing refining. Because most or all of the thermal requirement for melting has been satisfied before the material enters the vacuum refining stage, and heating of the refining stage can therefore be substantially avoided, excessive convection of the melt in the refining zone can be avoided. As a result, vessel erosion is reduced, and the probability of imcompletely refined portions of the melt becoming mixed with more refined portions is reduced. The short residence time of the melting material in the heated area of this arrangement is also advantageous for the sake of retaining volatile refining aids dissolved in the melt so that they can be utilized at the downstream refining zone.

It is preferred to heat the material in the final stage of the melting process (e.g., vessel 10) so as to raise its temperature in preparation for the refining stage to follow. Maximizing the temperature for refining is advantageous for the sake of reducing glass viscosity and increasing vapor pressure of included gases. Typically a temperature of about 2800° F. (1520° C.) is considered desirable for refining soda-lime-silica glass, but when vacuum is employed to assist refining, lower peak refining temperatures may be used without sacrificing product quality. The amount by which temperatures can be reduced depends upon the degree of vacuum. Therefore, when refining is to be performed under vacuum in accordance with the present invention, the glass temperature need be raised to no more than 2700° F. (1480° C.), for example, preferably no more than 2600° F. (1430° C.), and optimally no more than 2500° F. (1370° C.) prior to refining. Peak temperature reductions on this order result in significantly longer life for refractory vessels as well as energy savings. Combustion heat sources could be used in the vessel 10, but it has been found that this stage lends itself well to electric heating, whereby a plurality of electrodes 11 may be provided as shown in the FIGURE extending horizontally through the sidewalls. Heat is generated by the resistance of the melt itself to electric current passing between electrodes in the technique conventionally employed to electrically melt glass. The electrode 11 may be carbon or molybdenum of a type well known to those of skill in the art.

The valve controlling the flow of material from the melting vessel 10 to the refining stage 12 is comprised of a plunger 15 axially aligned with a drain tube 16. The shaft 17 of the plunger extends through the roof of the vessel 10 so as to permit control over the gap between the plunger 15 and the tube 16 to thereby modulate the rate of flow of material into the refining stage. The valve tube 16 may be fabricated of a refractory metal such as platinum and is fitted into an orifice at the upper end of the refining vessel, preferably in the roof 18 of the refiner, but a side wall location may also be feasible.

The refining stage 12 preferably consists of a vertically upright vessel that may be generally cylindrical in configuration, preferably with an enlarged upper portion to provide additional volume to contain the foam, and having an interior ceramic refractory lining 20 shrouded in a gas-tight water-cooled casing. The casing may include a double walled, cylindrical sidewall members 21 and 22 having annular water passageways, and circular end coolers 23 and 24. The roof 18 may be slightly domed for structural integrity and may also be provided with a fitted cooler 25. Any suitable cooling arrangement may be employed. A layer of insulation (not shown) may be provided between the lining 20 and the cooling jackets.

As the molten material passes through the tube 16 and encounters the reduced pressure within the refining vessel, gases included in the melt expand in volume, creating a foam layer 30 resting on a body of liquid 31. As form collapses it is incorporated into the liquid body 31. Subatmospheric pressure may be established within the refining vessel through a vacuum conduit 32 extending through the upper portion of the vessel. Optionally, a burner 33 may be provided to heat the upper portion of the vessel interior. Introducing the melt at or near the top of the vacuum vessel is preferred because it places the incoming, actively foaming material having the greatest gas content above the other material in the vessel, where the thin foam membranes are exposed to the lowest pressure and the gases escaping from bursting bubbles are most free to escape into the headspace.

Refined molten material is drained from the bottom of the refining vessel 12 by way of a drain tube 35 of a refractory metal such as platinum. The drain tube 35 preferably extends above the surface of the refractory bottom within which it is mounted to prevent any debris from entering the output stream. Leakage around the tube may be prevented by a water cooler 37 affixed to the bottom cooling jacket 24. The flow rate of molten material from the drain tube 35 may be controlled by a conical throttle member 38 carried at the end of a stem 39. The stem 39 is associated with mechanical means (not shown) to adjust the elevation of the throttle member 38 and thus adjust the gap between the throttle member an the tube 35 so as to control the flow rate therefrom. A molten stream 40 of refined material falls freely from the bottom of the refining vessel and may be passed to a forming station (not shown) where it may be shaped to the desired product. Refined glass, for example, may be passed to a float glass forming chamber where the molten glass floats on a pool of molten metal to form a flat sheet of glass.

The height of molten material 31 retained in the refiner 12 is dictated by the level of vacuum imposed in the chamber. The pressure head due to the height of the liquid must be sufficient to establish a pressure equal to or greater than atmospheric at the output to permit the material to drain freely from the vessel. The height will depend upon the specific gravity of the molten material, which for soda-lime-silica glass at the temperatures involved is about 2.3. A height in excess of the minimum required to offset the vacuum may be desired to account for fluctuations in atmospheric pressure, to permit variation of the vacuum, and to assure steady flow through the outlet. In the preferred embodiments of the present invention, a substantial excess height is provided so that the outlet flow rate is not determined by the vacuum pressure, but rather by mechanical valve means. Such an arrangement permits the throughput rate and the vacuum pressure to be varied independently of each other. Alternatively, the pressure at the output could be below atmospheric if the output is provided with pump means to overcome the pressure differential. An example of a pump that is intended for use with molten glass is disclosed in U.S. Pat. No. 4,083,711.

The benefits of vacuum on the refining process are attained by degrees; the lower the pressure, the greater the benefit. Small reductions in pressure below atmospheric may yield small improvements, but to economically justify the vacuum chamber the use of substantially reduced pressure is preferred. Thus, a pressure of no more than one-half atmosphere is preferred for appreciable refining improvements to be imparted to soda-lime-silica glass. Flat glass quality standards generally require absolute pressure less than 100 torr. To optimize the foam enhancement of the present invention, absolute pressure less than 50 torr are preferred. A typical range for float glass quality is 20 to 40 torr. A measure of the degrees of refining is the number and size of gaseous seeds remaining in the product glass. The maximum number of seeds allowed varies according to the intended use of the product, but an example of a high quality level sometimes required for commercial float glass is about one seed per 1,000 to 10,000 cubic centimeters. Seeds less than 0.01 millimeter in diameter are considered imperceptible and are not included in the seed counts. Other glass products such as container glass may permit ten times as many seeds or more.

Table I shows the correlation between the $SO_3$ concentration of the molten glass immediately prior to entering the vacuum chamber and the seed count of the product glass in an arrangement essentially as shown in the drawing. Examples 1 through 4 represent operation using only raw batch materials as the feed to the process. The $SO_3$ in examples 1 through 4 was derived from sulfur impurities in the batch materials; no sulfur source was deliberately added to the feed mixture. Examples 5 through 10 represent the initial use of 25% by weight cullet including less than 0.005% by weight $SO_3$ in the batch mixture. The $SO_3$ content of the cullet was very low due to its having been subjected to vacuum refining. As a result, the sulfur content of the batch and cullet mixture was significantly reduced, and the $SO_3$ content of the glass entering the vacuum refiner was reduced, as shown in the table. Although the gas content of the incoming glass was less, the seed counts of the glass after vacuum refining were found to be surprisingly increased. Examples 11, 12 and 13 involve the continued use of low sulfur cullet in the feed mixture, but also include the addition of sodium sulfate to the mixture to increase the amount of $SO_3$ in the molten glass entering the vacuum refiner, with the result that the seed counts improved. The seed counts reported herein were calculated to a standard thickness of 0.121 inch.

TABLE I

| | $SO_3$ (Weight %) | Pressure (torr) | Output (tons/day) | Seed Count (per square foot) |
|---|---|---|---|---|
| 1. | 0.035 | 37 | 15 | 0.5 |
| 2. | 0.024 | 37 | 12 | 0.5 |
| 3. | 0.021 | 37 | 24 | 18 |
| 4. | 0.025 | 37 | 24 | 11 |
| 5. | 0.022 | 25 | 24 | 35 |
| 6. | 0.016 | 37 | 24 | 28 |
| 7. | 0.014 | 37 | 24 | 46 |
| 8. | 0.012 | 25 | 24 | 70 |
| 9. | 0.004 | 37 | 24 | 54 |
| 10. | 0.003 | 37 | 24 | 56 |
| 11. | 0.008 | 37 | 24 | 36 |
| 12. | 0.015 | 37 | 24 | 31 |
| 13. | 0.027 | 37 | 24 | 5 |

The examples in Table I represent operations at different periods of time and may involve uncontrolled variables to which may be attributed some of the irregularities in the results. A more carefully controlled series of experiments is set forth in Table II, all of the data being taken from an operating period of a few days in which all conditions were maintained as constant as practical. The pressure was 37 torr and the output was 24 tons per day in all of the examples of Table II.

TABLE II

| | $SO_3$ (weight %) | Seed Count (per square foot) |
|---|---|---|
| 1. | 0.002 | 75, 75 |
| 2. | 0.010 | 40, 30 |
| 3. | 0.019 | 25, 15 |
| 4. | 0.029 | 10, 10, 10, 5 |

Table III shows the empirically derived, approximate relationship between the amount of sodium sulfate added to the batch mixture and the resulting $SO_3$ concentration in the molten glass immediately prior to entering the vacuum chamber. The relationship depends upon the temperature and residence time in the liquefying and intermediate stages upstream from the refining chamber, and therefore may vary somewhat from one installation to another.

TABLE III

| $Na_2SO_4$ Added (Parts by weight per 1000 parts by weight of sand) | $SO_3$ in Molten Glass (Weight %) |
|---|---|
| 0.00 | 0.004 |
| 0.138 | 0.007 |
| 0.270 | 0.010 |
| 0.50 | 0.019 |
| 1.00 | 0.032 |

Instead of adding sodium sulfate or other sulfur-containing material (e.g., calcium sulfate) to the batch mixture, the $SO_3$ content of the glass may be increased by bubbling a sulfur-containing gas such as $SO_2$ into the melt upstream from the vacuum chamber. A technique for bubbling $SO_2$ gas into molten glass is disclosed in U.S. Pat. No. 3,375,095 (Poole).

It is the primary objective of this invention to increase the volume expansion of the material upon foaming. Extending the expansion of the foam has also been found to expedite its collapse, which is desirable for the sake of maintaining a manageable height of foam within the refining vessel. However, it may be preferred to use auxiliary foam breaking means to suppress accumulation of foam, particularly at the higher volume expansion ratios. To this end, it may optionally be desirable to use the techniques disclosed in U.S. Pat. No. 4,794,860. In the preferred embodiment, a conduit may extend into the vacuum vessel for introducing foam-breaking agents such as water into contact with the foam. In the drawing, there is shown an arrangement for injecting the water or other foam-breaking liquid into the refining vessel 12 wherein a tube 41 carrying the liquid terminates within the foam layer 30. The tube 41 may extend into the foam from above or may extend substantially horizontally from an opening in the side wall of the vessel 12 at an appropriate elevation as shown in the FIGURE. The tube 41 may be provided with a water-cooled jacket to enhance its preservation. The pressure difference between the interior and exterior of the vessel will draw the liquid into the vessel.

Another foam-breaking technique that may optionally be employed in conjunction with the present invention is to periodically impose a sudden pressure change on the refining vessel interior. This may take the form of a pulse of reduced pressure from an auxiliary vacuum source. Alternatively, pulses of higher pressure may be provided by periodically opening the refining vessel interior to atmospheric pressure.

The foaming of the molten material as it enters the vacuum refining vessel is caused by enlargement of bubbles and gaseous seeds present in the melt and by relatively volatile substances coming out of solution. Any substance in the molten glass that is in the gas phase or comes out of solution under the conditions of the vacuum refining chamber will contribute to the expansion upon foaming. The bubbles and seeds that refining is intended to eliminate usually include nitrogen and carbon dioxide in addition to $SO_3$, but the foaming effects of the nitrogen and carbon dioxide appear to be far less significant than the $SO_3$. Water is also present in solution in molten glass, and its foaming effect can be significant. Commercial soda-lime-silica glass typically contains about 0.02 to 0.04 percent by weight later. This is insufficient for water to serve as the major foaming agent, but the amount of water present may be taken into account when calculating by the ideal gas law the amount of $SO_3$ needed to yield a desired foam expansion ratio. Some of the gas-producing constituents will remain dissolved or will become redissolved in the product glass, and this must also be taken into consideration when calculating the volume expansion during foaming. About 75 to 90 percent of the $SO_3$ will be extracted from the melt under the preferred vacuum refining conditions, but only about 40 to 50 percent of the water will be removed under the same conditions. For the foaming agents that remain in the glass after refining, solubility is an important consideration to assure that any residual seeds are reabsorbed into the glass and that a gaseous phase is not formed subsequently. The sulfur and halide foaming agents disclosed herein are characterized by high solubility in molten glass, so their small residues in the glass would not be expected to cause downstream bubble problems, nor would the presence of residual water since it is also relatively soluble.

Other variations as would be known to those of skill in the art may be resorted to within the scope of the present invention as defined by the claims that follow.

We claim:

1. In a method of refining glassy material wherein batch material is melted and a stream of the resulting molten material is foamed as it passes into a vessel in which subatmospheric pressure is maintained to remove gases from the molten material, the improvement comprising increasing the foaming by adding to the material upstream from the foaming step a sufficient amount of a volatile substance to produce at least an eight-fold volume increase as the material is foamed, whereby removal of the gases from the molten material is increased.

2. The method of claim 1 wherein the volume of the material is increased at least ten times.

3. The method of claim 1 wherein the volume of the material is increased at least fourteen times.

4. The method of claim 1 wherein the subatmospheric pressure maintained in said vessel is less than 50 torr absolute.

5. The method of claim 1 wherein the volatile substance is a refining aid selected from the group consisting of sulfur, halogens, or compounds thereof.

6. The method of claim 5 wherein the molten material entering the vessel maintained at subatmospheric pressure includes at least 0.010 percent by weight $SO_3$.

7. The method of claim 5 wherein the molten material entering the vessel maintained at subatmospheric pressure includes at least 0.025% by weight $SO_3$.

8. The method of claim 6 wherein the molten material entering the vessel maintained at subatmospheric pressure includes not more than 0.040% by weight $SO_3$.

9. The method of claim 6 wherein the molten material is melted from a mixture of raw batch materials and cullet, the cullet having less than 0.005% by weight $SO_3$.

10. The method of claim 1 wherein the molten material is at a temperature of at least 2500° F. when entering the vessel maintained at subatmospheric pressure.

11. The method of claim 1 wherein the molten material is soda-lime-silica glass.

12. In a method of refining glassy material wherein raw batch material and cullet, said cullet including less than 0.005% by weight $SO_3$ are melted and a stream of the resulting molten material is foamed as it passes into a vessel in which subatmospheric pressure is maintained to remove gases from the molten material, the improvement comprising increasing the foaming by adding to the material upstream from the foaming step a sufficient amount of a volatile substance to produce at least an eight-fold volume increase as the material is foamed, whereby removal of the gases from the molten material is increased.

13. The method of claim 1 wherein the volume of the material is increased at least ten times.

14. The method of claim 12 wherein the volume of the material is increased at least fourteen times.

15. The method of claim 12 wherein the subatmospheric pressure maintained in said vessel is less than 50 torr absolute.

16. The method of claim 12 wherein the molten material is at a temperature of at least 2500° F. when entering the vessel maintained at subatmospheric pressure.

17. The method of claim 12 wherein the molten material is soda-lime-silica glass.

* * * * *